United States Patent
Burkart et al.

(10) Patent No.: US 11,979,094 B2
(45) Date of Patent: May 7, 2024

(54) METHOD FOR OPERATING A POWER ELECTRONIC CONVERTER DEVICE WITH FLOATING CELLS

(71) Applicant: ABB Schweiz AG, Baden (CH)

(72) Inventors: Ralph Mario Burkart, Zürich (CH);
Ioannis Tsoumas, Zürich (CH);
Frederick Kieferndorf, Baden (CH);
Tobias Geyer, Ennetbaden (CH)

(73) Assignee: ABB Schweiz AG, Baden (CH)

( * ) Notice: Subject to any disclaimer, the term of this patent is extended or adjusted under 35 U.S.C. 154(b) by 152 days.

(21) Appl. No.: 17/789,899

(22) PCT Filed: Dec. 16, 2020

(86) PCT No.: PCT/EP2020/086544
§ 371 (c)(1),
(2) Date: Jun. 29, 2022

(87) PCT Pub. No.: WO2021/136666
PCT Pub. Date: Jul. 8, 2021

(65) Prior Publication Data
US 2023/0052562 A1 Feb. 16, 2023

(30) Foreign Application Priority Data
Dec. 31, 2019 (EP) .................... 19220220

(51) Int. Cl.
*H02M 7/49* (2007.01)
*H02M 1/00* (2006.01)
(Continued)

(52) U.S. Cl.
CPC .......... *H02M 7/49* (2013.01); *H02M 1/0022* (2021.05); *H02M 1/0067* (2021.05); *H02M 1/12* (2013.01); *H02M 1/15* (2013.01); *H02M 7/487* (2013.01)

(58) Field of Classification Search
CPC .......... H02M 1/12; H02M 1/123; H02M 1/14; H02M 1/15; H02M 1/0012; H02M 1/0022;
(Continued)

(56) References Cited

U.S. PATENT DOCUMENTS 5,805,437 A * 9/1998 Gruning ............... H02M 7/487
363/43
6,009,002 A * 12/1999 Steimer ................ H02M 7/483
363/40
(Continued)

FOREIGN PATENT DOCUMENTS

EP 2312739 B1 7/2013
EP 1253706 B1 8/2013
(Continued)

OTHER PUBLICATIONS

M. Schweizer, I. Tsoumas, M. Pathmanathan, A. Antonopoulos, U. Vemulapati, "Technical report, Topology Comparison for the next generation MV drive" (9ADB008543-015 Project IDA), Jul. 2016.
(Continued)

*Primary Examiner* — Thienvu V Tran
*Assistant Examiner* — Shahzeb K Ahmad
(74) *Attorney, Agent, or Firm* — Armstrong Teasdale LLP

(57) ABSTRACT

In one embodiment, a method of operating a power electronic converter device for an electrical power converter system is provided. The power electronic converter device includes a converter circuit, a first converter, and a second converter. The first converter and the second converter are switch with a switching pattern such that the first converter and the second converter generate voltages with stepwise voltages changes and an output voltage of the power electronic converter device results from a superposition of the voltages of the first converter and the second converter. The
(Continued)

switching pattern includes switching instants for the second converter such that the voltage of the second converter leaves the fundamental voltage component of the voltage of the first converter unchanged, such that the second converter does not generate a fundamental component of the output voltage.

15 Claims, 5 Drawing Sheets

(51) Int. Cl.
*H02M 1/12* (2006.01)
*H02M 1/15* (2006.01)
*H02M 7/487* (2007.01)

(58) Field of Classification Search
CPC .. H02M 1/0054; H02M 1/0067; H02M 1/007; H02M 7/42; H02M 7/48; H02M 7/4803; H02M 7/483; H02M 7/4833; H02M 7/4835; H02M 7/487; H02M 7/49; H02M 5/458; H02M 5/4585
See application file for complete search history.

(56) References Cited

U.S. PATENT DOCUMENTS

| | | | |
|---|---|---|---|
| 6,621,719 B2* | 9/2003 | Steimer | H02M 7/49 363/43 |
| 7,825,540 B2 | 11/2010 | Ogusa et al. | |
| 2012/0092915 A1* | 4/2012 | Okuda | H02M 7/487 363/132 |
| 2018/0309383 A1* | 10/2018 | Wang | H02M 7/5387 |
| 2019/0190397 A1 | 6/2019 | Van-Der-Maerwen et al. | |

FOREIGN PATENT DOCUMENTS

| | | | | |
|---|---|---|---|---|
| EP | 3142236 A1 | 3/2017 | | |
| RU | 2269196 C1 | 1/2006 | | |
| WO | WO-2018029303 A1 * | 2/2018 | .......... | H02M 5/4585 |
| WO | 2018072837 A1 | 4/2018 | | |
| WO | WO-2018072837 A1 * | 4/2018 | .............. | H02M 1/12 |

OTHER PUBLICATIONS

M. Veenstra, "Investigation and control of a hybrid asymmetric multi-level inverter for medium voltage applications", Ph. D. Thesis, École Polytechnique Fédérale Lausanne, 2003.
M. D. Manjrekar and T. A. Lipo, "A hybrid multilevel inverter topology for drive applications", APEC, 1998, pp. 523-529 vol. 2.
M. D. Manjrekar, P. Steimer and T. A. Lipo, "Hybrid multilevel power conversion system: a competitive solution for high power applications", Conference Record of the 1999 IEEE Industry Applications Conference, 1999, pp. 1520-1527 vol. 3.
International Search Report and Written Opinion for International Application No. PCT/EP2020/086544, dated Feb. 17, 2021, 14 pages.
C. Silva, S. Kouro, J. Soto and P. Lezana, "Control of a hybrid multilevel inverter for current waveform improvement", 2008 IEEE International Symposium on Industrial Electronics, 2008, pp. 2329-2335.
H. S. Patel and R. G. Hoft, "Generalized Techniques of Harmonic Elimination and Voltage Control in Thyristor Inverters: Part I—Harmonic Elimination", IEEE Transactions Industrial Applications, IA-9(3):310-317, May/Jun. 1973.
G. S. Buja, "Optimum Output Waveforms in PWM Inverters", IEEE Transactions Industrial Applications, IA-16 (6):830-836, Nov./Dec. 1980.
Rufer et al. "Control of a Hybrid Asymmetric Multilevel Inverter for Competitive Medium-Voltage Industrial Drives", IEEE Transactions on Industry Applications, vol. 41, No. 2, Mar./Apr. 2005 2017, pp. 655-664.
Mohamed S. A. Dahidah, Georgios Konstantinou, Vassilios G. Agelidis, "A Review of Multilevel Selective Harmonic Elimination PWM: Formulations, Solving Algorithms, Implementation and Applications", IEEE Transactions Power Electronics, vol. 30, No. 8, Aug. 2015, pp. 4091-4106.
Jackson Lago, Marcelo Lobo Heldwein, "Generalized Synchronous Optimal Pulse Width Modulation for Multilevel Inverters", IEEE Transactions Power Electronics, vol. 32, No. 8, Aug. 2017, pp. 6297-6307.
B. P. McGrath, D. G. Holmes, Th. Lipo, "Optimized Space Vector Switching Sequences for Multilevel Inverters", IEEE Transactions on Power Electronics, vol. 18, No. 6, 2003, pp. 1293-1301.
Silva et al. "Implementation and Control of a Hybrid Multilevel Converter With Floating DC Links for Current Waveform Improvement", IEEE Transactions Power Electronics, vol. 58, No. 6, Jun. 2011, pp. 2304-2312.
Hokayem et al. "Technical Report: Optimal Current Trajectories for Power Converters with Minimal Common Mode Voltage", Apr. 2, 2017.

* cited by examiner

METHOD FOR OPERATING A POWER ELECTRONIC CONVERTER DEVICE WITH FLOATING CELLS

CROSS-REFERENCE TO RELATED APPLICATIONS

This application is a National Stage Entry of International Patent Application No. PCT/EP2020/086544, filed Dec. 16, 2020 and titled "METHOD FOR OPERATING A POWER ELECTRONIC CONVERTER DEVICE WITH FLOATING CELLS", which claims priority to European Patent Application No. EP19220220.8, filed Dec. 31, 2019 and titled "METHOD FOR OPERATING A POWER ELECTRONIC CONVERTER DEVICE WITH FLOATING CELLS", each of which are hereby incorporated by reference in their entirety.

BACKGROUND

The present disclosure relates to a method, a computer program product and a computer readable medium for operating a power electronic converter device for an electrical power conversion system. Furthermore, the present disclosure relates to a power electronic converter device.

Document EP 1 253 706 B1 shows a electrical power conversion system with a power electronic converter device comprising: (i) a converter circuit including an input side with input terminals, a three phase output side with output terminals, a first converter and three second converters, each of them connected in series with the first converter with respect to a respective phase, each of said second converters comprising a floating cell with a capacitive element in a DC intermediate circuit and semiconductor devices, and (ii) a control device for driving semiconductor devices of at least one of the converters via pulse-like signals. The two converters are arranged to generate voltages with stepwise voltage change and an output voltage of the power electronic converter device results from the superposition of the voltages of the two converters, wherein the voltage of the first converter is a fundamental component of the output voltage at the output terminals. In detail the converter circuit consists of the first converter being a main converter and three auxiliary floating cells, one for each phase. In such a converter circuit the number of floating cells per phase is not fixed and more floating cells can be accommodated. The complete dc-to-ac conversion circuit therefore takes the form of a main power converter provided by the first converter, the auxiliary switching cells of the second converter, and passive filter circuits. The main converter is shown as a 3-level neutral point clamped converter using IGCTs but other topologies and semiconductor types are possible. By means of the floating cells a DC voltage can be added to or subtracted from a DC voltage of the first converter with the help of the semiconductor devices.

Each of documents RU 2 269 196 C1 and U.S. Pat. No. 7,825,540 B2 describes a quite similar electrical power conversion system with a power electronic converter device.

The major difficulty of such power electronic converter devices using the state-of-the-art hybrid multi-stage and common OPP modulation schemes, is the occurrence of large voltage step sizes of the output voltage. The voltage steps of the power electronic converter device should be as small as possible to minimize overvoltages at the load terminals and in the resistors of a corresponding EMC filter (EMC: electromagnetic compatibility).

US 2019/190397 A1 describes a converter system with a main converter and floating converter cells connected to the outputs of the main converter. Each floating converter cell is controlled by quantizing the output voltage error and the cell capacitor voltage and selecting the switching commands for the floating converter cell from a lookup table indexed by the quantized output voltage error and the quantized capacitor voltage. The main converter and the floating cell are modulated separately.

U.S. Pat. No. 6,009,002 A) describes a power electronics circuit with an NPC converter and floating cells connected to the AC outputs of the NPC converter. The dc links of the floating cells are fed via dedicated rectifiers and transformers. A third harmonic is mixed to a reference oscillation for the power electronics circuit, in order to make sure that the active power of the cell does not become negative in any operating point. This is necessary because the cell is supplied by a diode rectifier. It is possible to avoid energy feedback from the floating cells, and the efficiency of the entire system is increased. The switching losses could thus be kept extremely low.

RUFER A ET AL: "Control of a Hybrid Asymmetric Multilevel Inverter for Competitive Medium-Voltage Industrial Drives", IEEE TRANSACTIONS ON INDUSTRY APPLICATIONS, IEEE SERVICE CENTER, PISCATAWAY, NJ, US, vol. 41, no. 2, 1 Mar. 2005, pages 655-664, describes a converter system composed of an NPC converter and floating cells connected to the AC outputs of the NPC converter. The ratio between the dc link voltages of the NPC converter and floating cells is an integer, in this case three, so that one nine-level converter system arises. This one converter system is modulated with one carrier-based PWM stage. Furthermore, this approach does not guarantee that the fundamental voltage component of the floating cell is zero, which is necessary in order to keep the average capacitor voltage constant and avoid undesired capacitor charging/discharging the cell when it is not fed by a voltage source.

EP 3 142 236 A1 relates to converter control with offline computed optimized pulse patterns, where the optimized pulse patterns are adapted online such that a difference between a converter flux reference and a converter flux estimate is minimized.

WO 2018/072 837 A1) describes a modular multilevel converter with star-connected branches made of series connected converter cells. The converter is controlled with offline computed optimized pulse patterns, which are further optimized online by model predictive control.

BRIEF DESCRIPTION

The present disclosure provides means to overcome the above-mentioned difficulty. The present disclosure further provides means for controlling a converter with floating cells connected to AC outputs of a main converter in a simple, computational less demanding way with low harmonic distortion.

This is achieved by the subject-matter of the independent claims. Advantageous embodiments are given in the dependent claims, in the further description as well as in the figures, wherein the described embodiments can, alone or in any combination of the respective embodiments, provide a feature of the present disclosure unless not clearly excluded.

Described is a method for operating a converter device for an electrical power conversion system, the power electronic converter device comprising a converter circuit including an input side with input terminals, an output side with at least one AC output terminal, such as three AC output terminals, a first converter with semiconductor devices, wherein the first converter is connected to the input terminals, and at least one second converter connected between an AC output of the first converter and the AC output terminal. The second converter includes a floating cell with a DC intermediate circuit and semiconductor devices or a series connection of a plurality of floating cells each with a DC intermediate circuit and semiconductor devices.

The power electronic converter device may include a control device for driving the semiconductor devices of at least one of the converters, for example via pulse-like signals. The method may be performed by the control device.

The first converter and the second converter are switched with a switching pattern include first switching instants for the semiconductor devices of the first converter and second switching instants for the semiconductor devices of the second converter, such that the two converters generate voltages with stepwise voltage change and an output voltage of the power electronic converter device results from the superposition of the voltages of the two converters.

The switching instants of the switching pattern are selected, such that, if the step size of a first switching instant of the first converter exceeds a step size limit, a compensating switching instant for the second converter is included in the switching pattern, which compensating switching instant results in a voltage of the second converter, which reduces the step size at the output voltage compared with the step size at the voltage of the first converter. This may reduce stress on the load and losses in passive filters that may exist between the converter and the load.

The switching pattern includes switching instants for the second converter, which are neighboring the compensating switching instant and which directions and switching times are selected, such that the voltage of the second converter leaves the fundamental voltage component of the voltage of the first converter unchanged. The second converter and/or the floating cells are controlled, such they do not generate a fundamental component of the output voltage. This may simply control and/or simplify optimization of the optimized pulse pattern.

The voltage of the first converter provides a fundamental component of the output voltage. According to several embodiments of the disclosure the control device drives the semiconductor devices of the at least one floating cell in such a way that the voltage of the second converter has a temporary voltage characteristic which reduces the step size at the output voltage compared with the step size at the voltage of the first converter, if the step size at the voltage of the first converter exceeds a step size limit. By this measure the height of the voltage steps of the power electronic converter device can be reduced to minimize overvoltages at the load terminals and in the resistors of a corresponding EMC filter (EMC: electromagnetic compatibility). A compensation switching instant and the corresponding neighboring switching instants for the second converter may be seen as the temporary voltage characteristic reduces the step size at the output.

According to an embodiment of the disclosure, the switching pattern is stored in a table of precomputed optimized pulse patterns. Such a table may be provided in the controller. Precomputed may refer to an optimization and/or calculation of the optimized pulse patterns before the converter device is operated. This may be done in a computing device remote from the converter device.

According to an embodiment of the disclosure, the switching pattern has been optimized offline, such that the first switching instants generate the fundamental voltage component and such that the second switching instants leave the fundamental voltage component unchanged. In general, the switching pattern may include a first optimized pulse pattern for the first converter, which provides the first switching instants, and a second optimized pulse pattern for the second converter, which provides the second switching instants. Optimization goals for the two optimized pulse patterns may be different. An optimization goal for the first optimized pulse pattern may be to generate the fundamental voltage component alone. An optimization goal for the second optimized pulse pattern may be to generate no fundamental voltage component at all.

According to an embodiment of the disclosure, the switching pattern is modified online by including the compensating switching instant and the neighboring switching instants into a precomputed optimized pulse pattern.

The control device may drive the semiconductor devices of the at least one floating cell by use of modified pulse pattern to generate the temporary voltage characteristic.

According to an embodiment of the disclosure, the switching times of the included neighboring switching instants are optimized online, such that the voltage of the second converter leaves the fundamental voltage component of the voltage of the first converter unchanged. It also may be that the compensating switching instant and/or the neighboring switching instants are included online into a precomputed optimized pulse pattern. At least one time interval of the stepwise voltage change at the temporary voltage characteristic may be at least partly smaller than a time constant of the stepwise voltage change of the remaining voltages of the two converters.

According to an embodiment of the disclosure, the compensating switching instant results in a double step voltage change between a positive voltage and a negative voltage of a floating cell. A floating cell may switch between the states of providing no voltage, providing a positive voltage and providing a negative voltage, i.e., between three different output voltages. The floating cell may provide one double voltage step and two single voltage steps, each of which in a positive and a negative direction. With the double step, the voltage step of the first converter exceeding the limit may be compensated.

According to an embodiment of the disclosure, a neighboring switching instant results in a single step voltage change between the positive voltage and a zero voltage or the negative voltage and the zero voltage. With a single step, the double step may be prepared and the change in the voltage-seconds caused by the different switching may be compensated by further single steps.

According to an embodiment of the disclosure, for compensating the step size of the first switching instant of the first converter exceeding the step size limit, the second switching instants include a single step voltage change in a first direction before the switching time of the first switching instant. Furthermore, the second switching instants include the compensating switching instant at the switching time of the first switching instant with a double step voltage change in an opposite direction.

According to an embodiment of the disclosure, the second switching instants include a single step voltage change in the first direction after the switching time of the first switching instant exceeding the step size limit.

According to an embodiment of the disclosure, the second switching instants include two single step voltage changes in the first direction at different switching times before the switching time of the first switching instant exceeding the step size limit.

According to an embodiment of the disclosure, the second switching instants include two single step voltage changes in the first direction at different switching times after the switching time of the first switching instant exceeding the step size limit.

For example, the stepwise voltage change at the temporary voltage characteristic is one of (a) a plus-minus scheme, (b) a minus-plus scheme, (c) a plus-minus-plus scheme, and (d) a minus-plus-minus scheme.

According to another embodiment of the disclosure, the compensating switching instant and the neighboring switching instants are included into a precomputed optimized pulse pattern. The temporary voltage characteristic may be generated by means of an online post processing by means of multi-stage modulation scheme.

According to an embodiment of the disclosure, the temporary voltage characteristic is generated by means of an online post processing by means of an OPP modulator.

According to another embodiment of the disclosure, the precomputed switching patterns are optimized based on at least one cost function and constraints. The control device may drive the semiconductor devices by use of offline computed OPPs, based on at least one cost function and constraints. Offline computed optimized pulse patterns (OPP) are also known as Synchronous Optimal PWM (SO-PWM). OPPs are specific pulse width modulation (PWM) methods that enable the optimal distribution of harmonic energy across the frequency spectrum based on a user-defined cost-function and constraints.

According to yet another embodiment of the disclosure, the switching pattern is composed of optimized pulse patterns for the first converter and for the second converter, which are based on individual cost functions and constraints. The OPPs for the first converter and each DC intermediate circuit are based on individual cost functions and constraints.

A further aspect of the disclosure relates to a computer program product, which includes computer-executable program code portions having program code instructions configured to execute the aforementioned method when loaded into a control device, especially into the processor of a computer-based control device. A further aspect of the disclosure relates to computer readable medium, in which such a computer program product is stored.

A further aspect of the disclosure relates to aa power electronic converter device for an electrical power conversion system as described above and below. The power electronic converter device includes a control device configured for performing the method as described above and below.

The control device may be arranged to drive the semiconductor devices of the at least one floating cell in such a way that the voltage of the second converter has a temporary voltage characteristic which reduces the step size at the output voltage compared with the step size at the voltage of the first converter, if the step size at the voltage of the first converter exceeds a step size limit. In the following, the voltage of the intermediate circuit is also referred to as the voltage of the floating cell.

The advantageous embodiments mentioned in connection with the procedure for operating a power electronic converter device shall apply mutatis mutandis also to the corresponding power electronic converter device and vice versa.

The control device may be arranged to drive the semiconductor devices of the at least one floating cell by use of modified pulse pattern to generate the temporary voltage characteristic.

According to an embodiment of the disclosure at least one time interval of the stepwise voltage change at the temporary voltage characteristic is at least partly smaller than a time constant of the stepwise voltage change of the remaining voltages of the two converters.

The stepwise voltage change at the temporary voltage characteristic may be one of the following schemes (a) a plus-minus scheme, (b) a minus-plus scheme, (c) a plus-minus-plus scheme, and (d) a minus-plus-minus scheme.

According to another embodiment of the converter device according to the disclosure, the power electronic converter is arranged to generate the temporary voltage characteristic by means of an online post processing by use of multi-stage modulation scheme and/or an OPP modulator.

According to an embodiment of the disclosure, the control device is adapted to drive the semiconductor devices by use of offline computed OPPs, based on at least one cost function and constraints.

Further features of the disclosure are apparent from the claims, the figure and the description of the figure. All the features and feature combinations mentioned above in the description as well as the features and feature combinations mentioned below in the description of the figure and/or shown in the figure alone are usable not only in the respectively specified combination, but also in other combinations or alone.

Now, the disclosure is explained in more detail based on preferred embodiment as well as with reference to the attached drawings.

BRIEF DESCRIPTION OF THE DRAWINGS

These and other aspects of the disclosure will be apparent from and elucidated with reference to the embodiments described hereinafter. Individual features disclosed in the embodiments can constitute alone or in combination an aspect of the present disclosure. Features of the different embodiments can be carried over from one embodiment to another embodiment.

DETAILED DESCRIPTION

Figure 1:
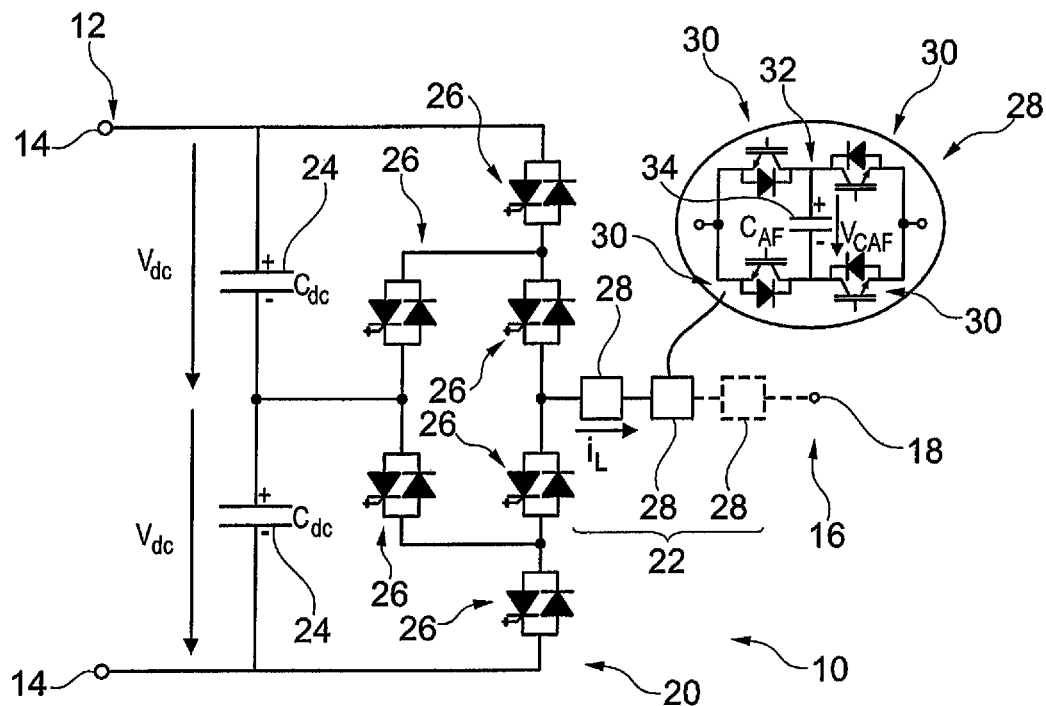
FIG. 1 shows a schematic diagram of a converter circuit with a first and a second converter of a power electronic converter device according to a first embodiment of the disclosure.

FIG. 1 shows a schematic diagram of a converter circuit 10. The converter circuit 10 shows one-phase of a three-phase converter device, which includes an input side 12 with input terminals 14, an output side 16 with an output terminal 18, a first converter 20 and a second converter 22 connected in series with the first converter 20. The first converter 20 is a neutral-point clamped (NPC) converter or an active neutral-point clamped (ANPC) converter. It could be another type of three-level converter, a two-level converter or a converter with more than three levels. The first (main) converter 20 includes capacitive elements 24 (depicted as capacitors) and semiconductor devices 26. The second converter 22 includes a series connection of a plurality of floating cells 28. These floating cells 28 function as active filters (AF) and are therefore also called "AF cells" (AFC) or "H-bridge AF cells". Each floating cell 28 includes two pairs of semiconductor devices 30 and a DC intermediate circuit 32 with a capacitive element 34 (depicted as capacitor) interconnected between the two pairs of semiconductor devices 30. The capacitive element 34 has a capacitance $C_{AF}$ leading to a corresponding voltage $V_{C\_AF}$ at the DC intermediate circuit 32.

The basic AF control objective is to compensate the three phase (3 L) (A)NPC output waveform harmonics while maintaining the average value of each AF cell capacitor voltage $V_{C\_AF}$ at its reference (AF balancing). The balancing control concept should also enable the use of the floating cells 28 as an add-on to existing converters. An additional control requirement is its suitability to modular concepts to ensure it can be easily adjusted to higher DC-link voltages and higher capacitor voltages as well as a higher number of floating cells 28.

Figure 2:
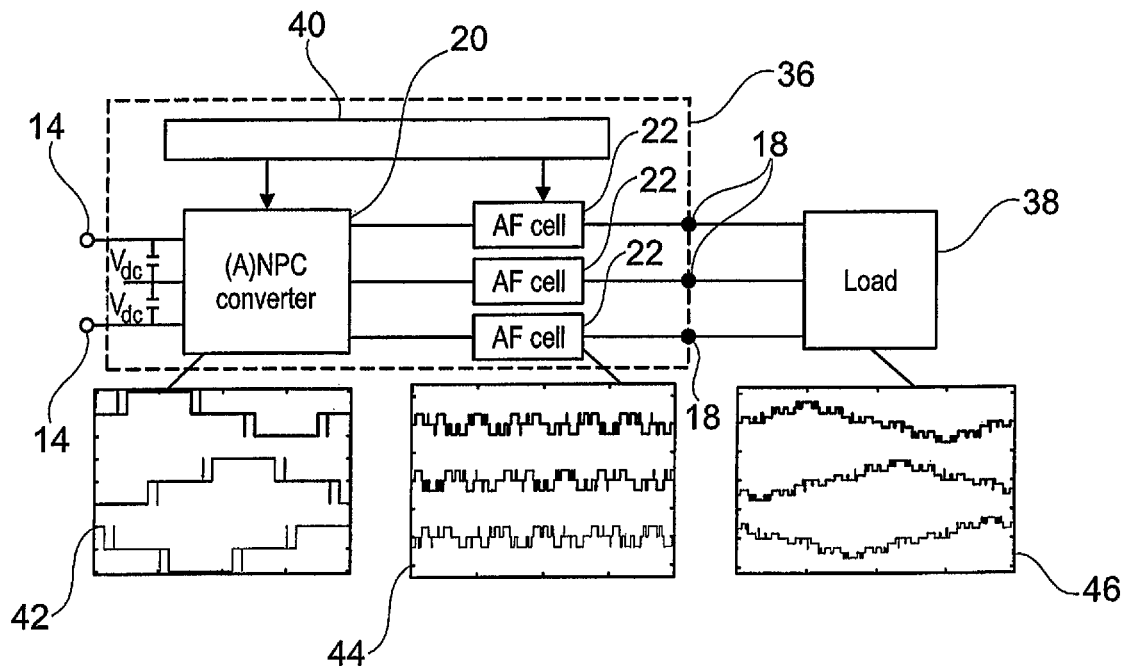
FIG. 2 shows a schematic diagram of a power electronic converter device according to a second embodiment of the present disclosure together with a three-phase load connected to the power electronic converter device.

FIG. 2 shows a power electronic converter device 36 according to a first embodiment and a load 38 connected to the output side 20 of the converter device 36. The converter device 36 includes the converter circuit 10 and a control device 40 for driving the semiconductor devices 26, 30 of at least one of the converters 20, 22 via pulse-like signals. The control device 40 drives the semiconductor devices 26, 30 e.g., by use of OPPs.

In the example the first converter 20 and the floating cells 28 are modulated by OPPs for a three-phase load 38. The steps of the switching transitions of the 3L(A)NPC are higher than the ones of the AF switching transitions. A fundamental voltage component must be generated only by the first converter 20 (the 3L(A)NPC converter), the fundamental voltage component of the floating cell(s) 28 is zero since it can't provide active power. The resulting voltage 46 at the load 38 is depicted as a 3-phase voltage course.

According to one embodiment, the series-connected converters 20, 22, such as the topology depicted in FIG. 2, are modulated with offline computed optimized pulse patterns (OPP) also known as Synchronous Optimal PWM (SO-PWM). OPPs are specific pulse width modulation (PWM) methods that enable the optimal distribution of harmonic energy across the frequency spectrum based on a user-defined cost-function and constraints. In contrast to classical CB-PWM, improved voltage and current quality can be achieved such as lower TDD (TDD: Total Demand Distortion). OPPs have been successfully employed in medium voltage multi-level converters. For the computation of the multi-level OPPs only the different levels of the waveform are typically considered without any special considerations of the type (cascaded H-bridge, modular multilevel converter etc.) and the individual characteristics (voltage level, pulse numbers, fundamental components) of the different converter stages of the power electronic converter device 36.

Figure 3:
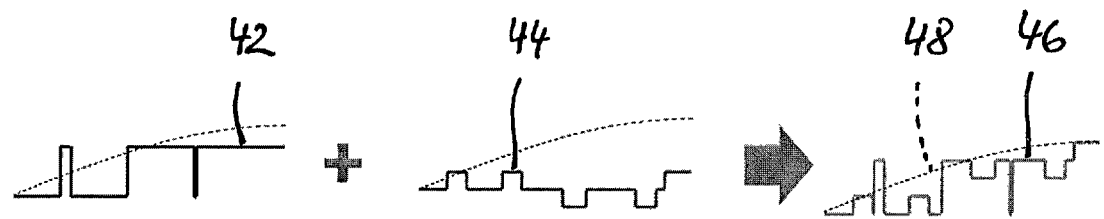
FIG. 3 shows two-stage switching pattern signals for a 3LANPC and AFC configuration.

For the power electronic converter device 36 with series-connected converters 20, 22 one could formulate and solve the optimization problem for each converter 20, 22 separately, resulting in individual OPPs based on individual cost functions and constraint sets. However, for series-connected converters 20, 22 the voltage 46 applied to the load 38, e.g. an electrical machine like an electric motor, is the sum of the individual voltage contributions 42, 44 as depicted in FIGS. 2 and 3. This key observation implies that if it is aimed at improving the voltage and current quality that is determined by the spectrum of the total voltage, solving individual optimization problems for each converter 20, 22 will in general not result in an optimal solution. It is therefore proposed to simultaneously consider the switching instants of series-connected converters 20, 22 in an attempt to optimize a single cost function, resulting in a common OPP. At the same time the voltage levels, the pulse numbers and the fundamental components of the individual converters 20, 22 can be selected independently from each other.

There are four main criteria to assess the performance of a particular modulation scheme:
1. Total demand distortion (TDD): the ratio between the rms value (rms: root mean square) of all (load/motor) current harmonics and the nominal fundamental (motor) current. The TDD should be limited as much as possible to avoid additional losses and temperature rise in the load (e.g., the motor).
2. Pulse numbers: pulse numbers of the 3LANPC and the AFCs. The pulse numbers (number of output voltage transitions per period) for a given TDD should be as low as possible to minimize the semiconductor switching losses.
3. Voltage step size: the size of the voltage steps at the converter device output terminals 18: The voltage steps should be as small as possible to (i) minimize overvoltages (due to reflections) at the load terminals, and to (ii) minimize losses in the resistors of a corresponding EMC filter (EMC: electromagnetic compatibility).
4. Static AFC balancing: whether or not the modulation generates a fundamental component for the AFCs. Due to the floating capacitive elements 24, the AFCs must not contribute to the fundamental voltage generation.

Figure 4:
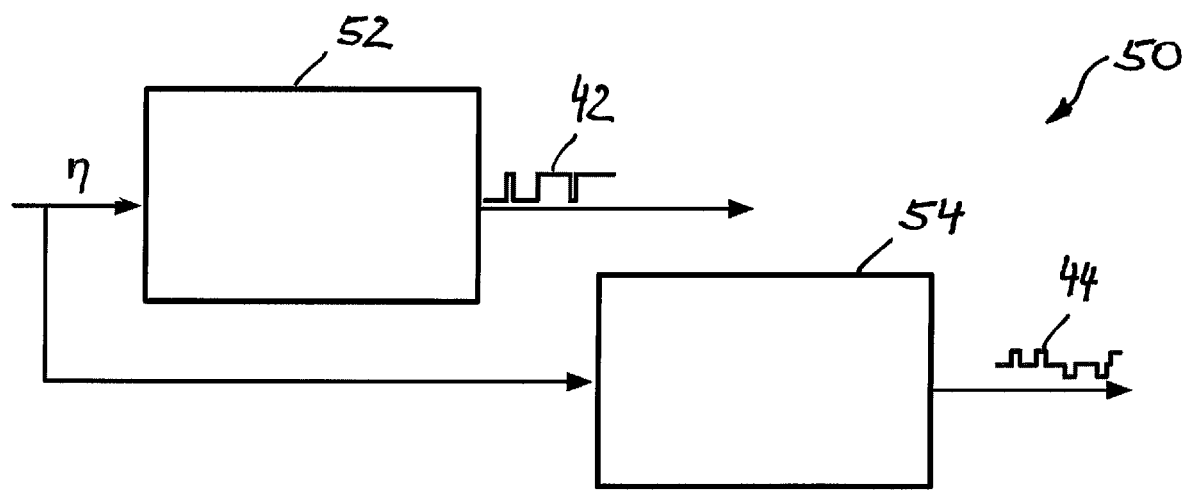
FIG. 4 shows a schematic representation of a two-stage modulator.

Examples of resulting OPPs for a two-stage converter device 36 consisting of a 3LANPC with one AFC in series are shown in FIG. 2 and FIG. 4. The individual OPPs have different heights and pulse numbers. The addition of the individual voltage contributions at the motor results in an optimal waveform close to a sinusoidal waveform with a low harmonic current. Furthermore, solely the waveform of the voltage 42 of the first converter 20 (3LANPC voltage in the example) generates a fundamental component, whereas the fundamental component of the voltage 44 of the second converter 22 (AFC voltage in the example) is zero as depicted in FIG. 3. This means that the fundamental component of the total output voltage waveform comes only from the first converter 20 (3LANPC in the example), which is necessary in order to keep the average value of the AFC floating capacitive element voltage constant. The switching angles of the individual converters 20, 22 are stored for each modulation index η and the modulator switches the individual converters 20, 22 accordingly as shown in FIG. 4 for the case of two converters 20, 22 in series. FIG. 4 shows a schematic diagram of a two-stage OPP modulator system representing a multi-stage modulation scheme 50 (a two-stage modulation scheme in the shown example). This system 50 includes a first modulator block 52 which generates pulse patterns for the first converter 20 according to a modulation index η and a second modulator block 54 which generates pulse patterns for the second converter 22 according to the modulation index η. The pulse pattern corresponds to the associated converter voltages 42, 44 as shown in FIG. 3.

The assessment of the modulation scheme regarding the above mentioned four main criteria to assess the performance of a particular modulation scheme yields the following findings:

TDD: the spectrum of the sum of the individual voltage contributions can be optimized for given pulse numbers of the individual converters 20, 22 using a suitable cost function, e.g., the load TDD (e.g., motor TDD).

Pulse numbers: the multi-stage approach allows for an independent selection of the pulse numbers of each converter 20, 22. This feature gives full control over the semiconductor switching losses.

Step size: as in the hybrid multi-stage approach, the minimization of the OPP cost function will not guarantee that the overall converter device 36 only switches between adjacent voltage levels with the minimum possible step-sizes.

Static balancing: in this approach a separate constraint for the fundamental components of each converter can be set. Thus, it can be guaranteed that in steady state and in the ideal case the fundamental component in the output voltage waveform of the floating cells 28 (AFCs) is zero. This saves control effort in steady state and facilitates the application of the optimal switching instants for each converter that have been theoretically computed.

The major difficulty of the modulation schemes with controllable individual pulse numbers, i.e., the state-of-the-art hybrid multi-stage and the common OPP modulation schemes, is the occurrence of "voltage step sizes which exceed a step size limit at which a minimum step size can no longer be assumed" (non-minimal voltage step sizes). Therefore, it is proposed to modify the switch position patterns yielding non-minimal voltage steps that result from these modulation schemes as illustrated in FIG. 5 which results in a temporary voltage characteristic 56 which reduces the step size at the output voltage 46 compared with the step size at the voltage 42 of the first converter 20.

The main idea lies in breaking up a large step 58 into a series of smaller steps 60 by means of a suitable switch position pattern of the series-connected floating cells 28 (AFCs). Note that similar switch position patterns as those shown on the right-hand side of FIG. 5 may occur when using the aforementioned modulation schemes.

Figure 5:
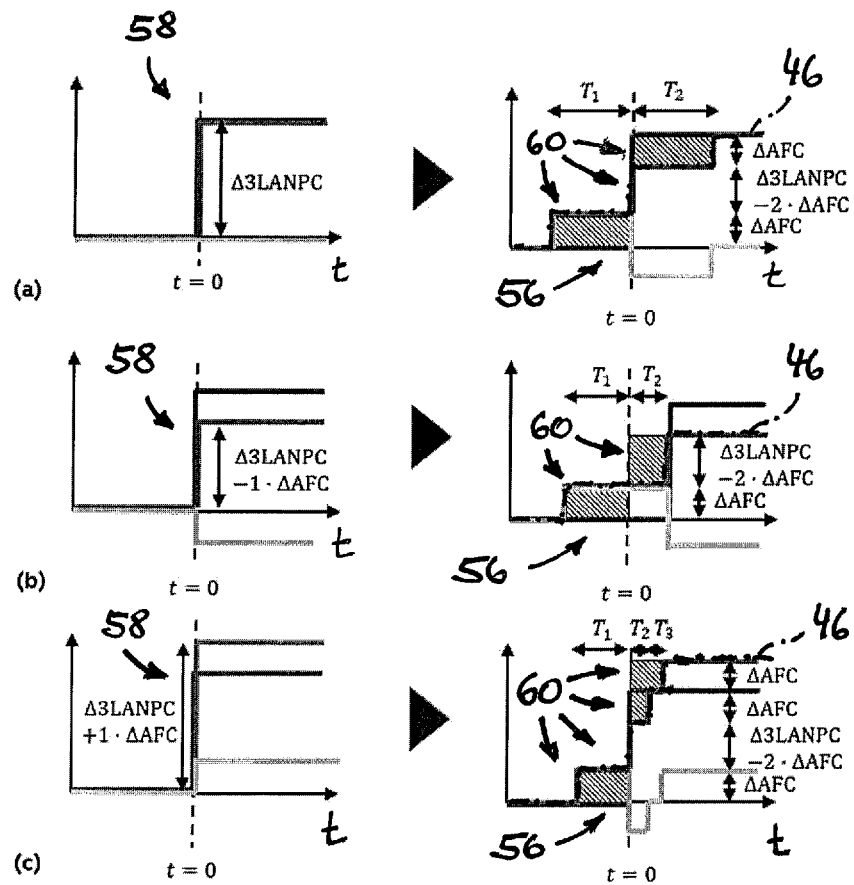
FIG. 5 shows switching patterns of a step size reduction scheme according to a preferred embodiment of the disclosure.

However, the proposed patterns on the right-hand side of FIG. 5 are both quantitatively and qualitatively different for the following reasons:

1. For the modulation schemes described before, the timing of the patterns, i.e., the time intervals T1, T2 and T3, is predetermined by the modulation principle and cannot be modified. In contrast, the proposed patterns feature a flexible timing that can be determined by the system designer. The switching time intervals T1, T2 and T3 can e.g. (but do not necessarily have to) be chosen such that the volt-seconds of the original pattern generated by the modulation remains unchanged (equal shaded areas in FIG. 5).

2. For the above-described modulation schemes, the patterns similar to those shown on the right-hand side of FIG. 5 are automatically generated as a result of the modulation principle. In contrast, the proposed patterns are intentionally inserted into the modulation scheme whenever considered necessary, i.e., where the modulation scheme generates the pattern shown on the left-hand side of FIG. 5.

Figure 6:
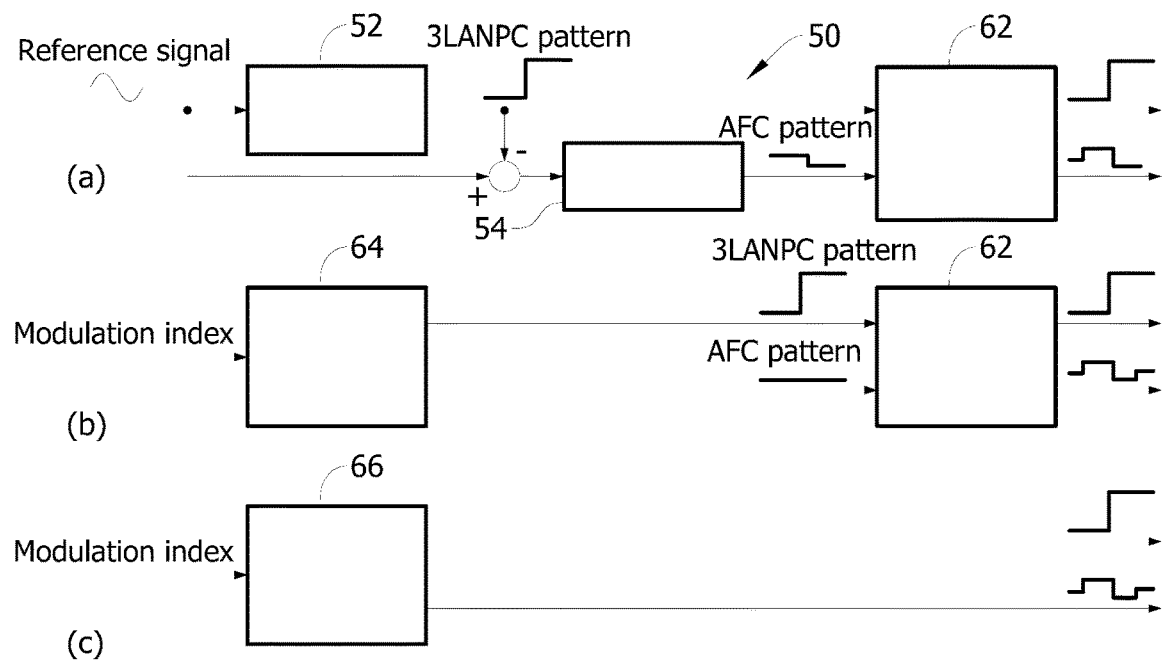
FIG. 6 shows three implementation options (a)-(c) for the step size reduction scheme of modulation schemes with controllable individual pulse numbers.

FIG. 6 shows three implementation options (a)-(c) for the step size reduction scheme of modulation schemes with controllable individual pulse numbers. The step size reduction scheme (block 62 in FIG. 6) can be implemented either online or offline depending on the utilized modulation scheme. The online approach is effective in conjunction with the hybrid multi-stage modulation (multi-stage modulation scheme 50) as shown in FIG. 6(a) or the common OPP modulation scheme 64 as shown in FIG. 6(b). The online step size reduction scheme delays the switch position patterns by T1 to carry out the desired modifications. This drawback can be overcome if an OPP modulation is utilized. In such a case, the step size reduction scheme can be carried out offline. The online OPP modulator 66 will then generate switch position patterns that already feature minimum step sizes, cf. FIG. 6(c). In other words, this online OPP modulator 66 is an OPP modulator including step size reduction.

In the following some Simulation Results (TDD Comparison) are discussed and a brief performance comparison between the hybrid multi-stage approach and the multi-stage common OPP is carried out. A single-stage CB-PWM is not considered in this comparison since it performs worse than the hybrid multi-stage approach regarding TDD and static balancing. The investigations consider a 3LANPC+AFC converter as shown in FIGS. 1 and 2 with an AFC floating capacitor voltage of ⅓ of half of the 3LANCP DC-link voltage. The multi-stage common OPP has been calculated as discussed above. For the CB-PWM of the 3LANPC a carrier frequency of six times the fundamental has been selected. In addition, level shifted carriers with phase opposition disposition have been used with a phase of π for the upper carrier, in order to have quarter wave symmetry and a pulse number of 3, as in the in the multi-stage common OPP.

Figure 7:
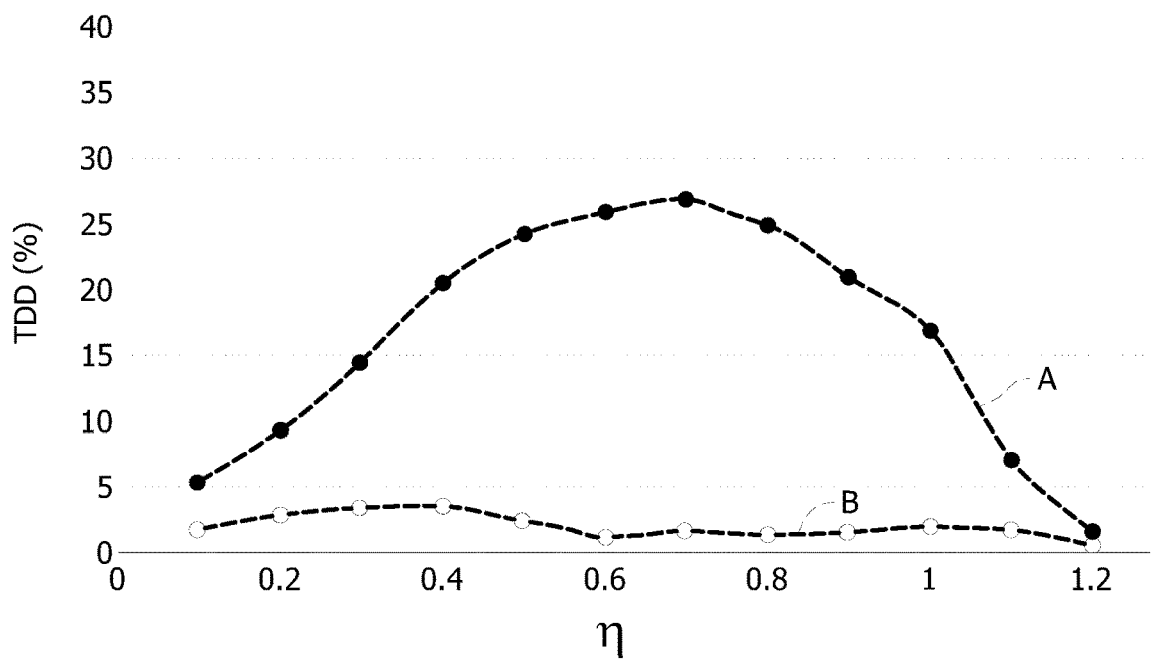
FIG. 7 shows TDD as a function of the modulation index when having a 3LNPC converter with one AFC in series.
Figure 8:
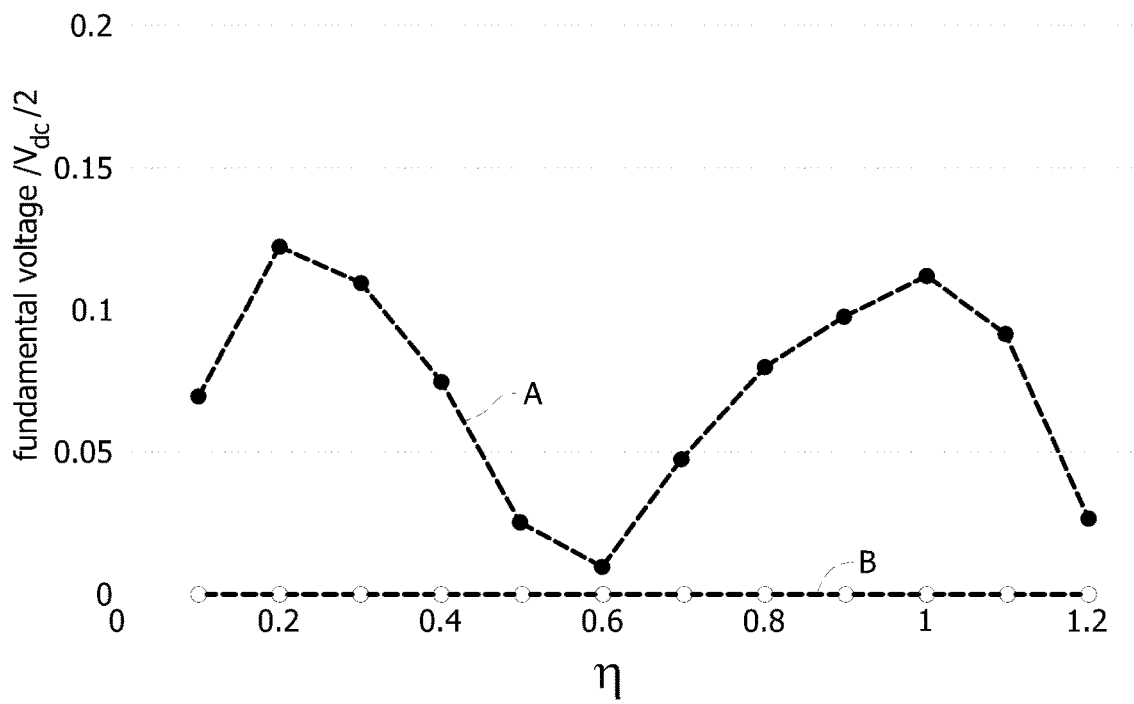
FIG. 8 shows AFC fundamental component as a function of the modulation index when having a 3LANPC converter with one AFC in series.

FIG. 7 shows TDD as a function of the modulation index η when having a 3LNPC converter with one AFC in series for a fundamental output frequency of 50 Hz with A: CB-PWM for both converters (d1=3 and d2=19) and B: common OPP (d1=3 and d2=19). The 3LANPC reference is computed by adding an appropriate common mode signal to the sinusoidal reference, so that the 3LANPC output voltage has an optimal harmonic profile. The AFC reference is equal to the difference between the 3LANPC output voltage and the sinusoidal 3LANPC sinusoidal reference. In addition, a common mode signal equal to the "min-max" of the references of the three phases is added to the reference signals of each phase, in order to better utilize the available AFC voltage. The carriers have been selected in such a way that the resulting pulse number for the AFC is equal to 19, same as in the case of the multi-stage common OPP.

In FIG. 7, the TDD as function of the modulation index for both modulation approaches is shown. A purely inductive load with an impedance of 0.2 p.u. has been considered for the calculation of the TDD. It can be seen that, although the 3LANPC and AFC switching frequencies are the same in both cases, the TDD is up to 17 times higher compared to the common OPP. It approaches values of 27% in some modulation index ranges, whereas in the case of the common OPP it stays always below 4%. In addition, as can be seen in FIG.

8, a significant fundamental component is generated by the AFC when using hybrid multi-stage CB-PWM, which has to be compensated by a voltage balancing controller. This component is due to the over modulation of the AFC whose voltage is often lower than its CB-PWM reference. In the case of the multi-stage common OPP the fundamental component of the AFC is zero as desired.

Figure 9:
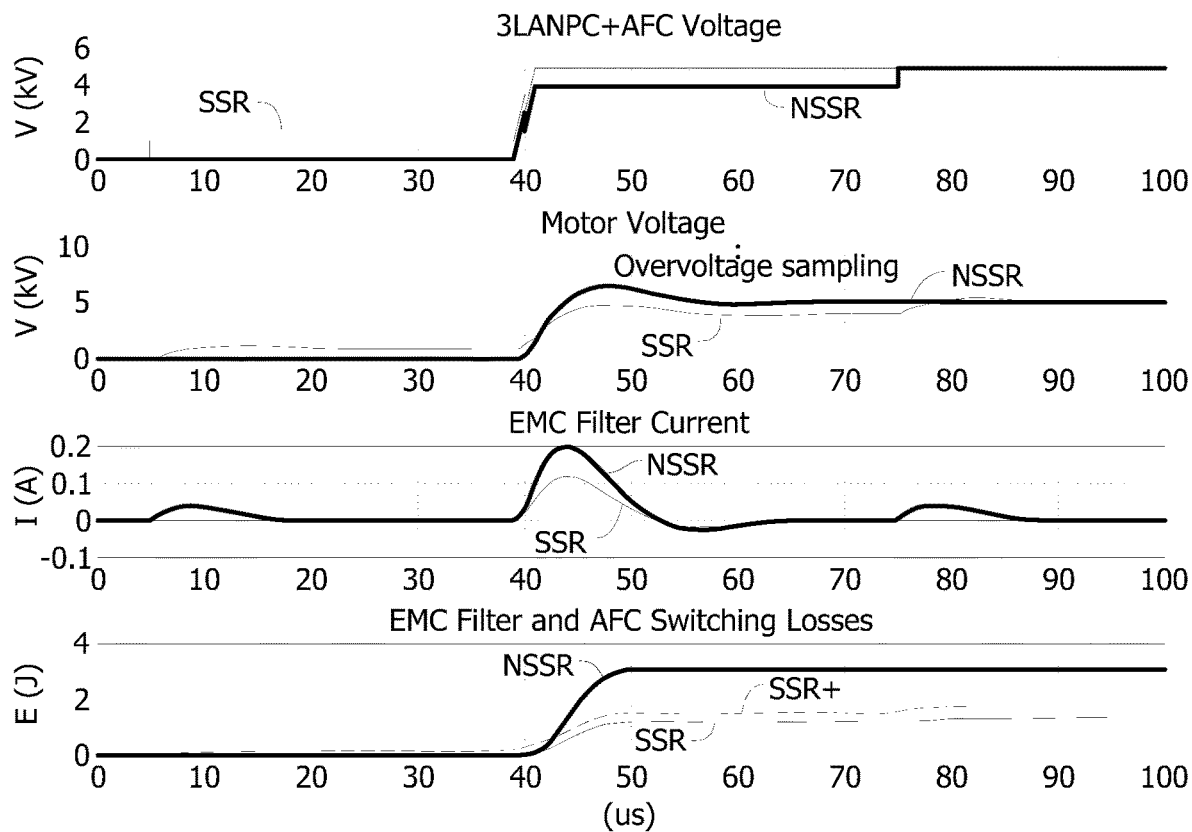
FIG. 9 shows a comparison of a 3LANPC switching transition without and with the proposed step size reduction scheme.

Last of all a demonstration of the performance gain of the proposed step size reduction scheme is discussed. We assume the topology of FIGS. 1 and 2 with an AFC floating capacitor voltage of ⅕ of half of the 3LANCP DC-link voltage. We consider a single phase of the converter, EMC filter, cable and the motor and compare a non-compensated 3LANPC pulse with a 3LANPC pulse that is modified with the proposed voltage pattern of FIG. 5(a). A typical medium voltage IGCT and low voltage IGBT have been considered for the 3LANPC and the AFC, respectively. The resulting waveforms are depicted in FIG. 9, which shows a comparison of a 3LANPC switching transition without and with the proposed step size reduction scheme. Corresponding parameter (output voltage, load/motor voltage, EMC filter current and EMC filter and AFC switching losses) are shown for step size reduction SSR and no step size reduction NSSR. The losses are shown additionally for step size reduction plus switching losses. It can be seen that the overvoltage on the motor terminal can be significantly reduced from 1.37 kV to 0.27 kV (−80%) by means of the step size reduction scheme. The losses in the EMC filter resistor can be reduced from 3.1 J to 1.35 J (−56%). When taking into account the additional switching losses due to the 4 additional AFC pulses, the overall losses are reduced by 44%.

The invention claimed is:

1. A method for operating a power electronic converter device for an electrical power conversion system,
the power electronic converter device comprising a converter circuit including an input side with input terminals, an output side with at least one AC output terminal, a first converter with semiconductor devices connected to the input terminals, and at least one second converter connected between an AC output of the first converter and the AC output terminal, the second converter comprising at least one floating cell with a DC intermediate circuit and semiconductor devices,
wherein the first converter and the second converter are switched with a switching pattern comprising first switching instants for the semiconductor devices of the first converter and second switching instants for the semiconductor devices of the second converter, such that the first converter and the second converter generate voltages with stepwise voltage changes and an output voltage of the power electronic converter device results from a superposition of the voltages of the first converter and the second converter,
wherein the first switching instants of the switching pattern are selected, such that a voltage of the first converter provides a fundamental voltage component of the output voltage,
wherein the first switching instants and the second switching instants of the switching pattern are selected, such that, if a step size of a first switching instant of the first converter exceeds a step size limit, a compensating switching instant for the second converter is included in the switching pattern, which compensating switching instant results in a voltage of the second converter, which reduces the step size at the output voltage compared with the step size at the voltage of the first converter, and
wherein the switching pattern comprises switching instants for the second converter, which are neighboring the compensating switching instant and which directions and switching times are selected, such that the voltage of the second converter leaves the fundamental voltage component of the voltage of the first converter unchanged and such that the second converter does not generate a fundamental component of the output voltage.

2. The method according to claim 1, wherein the switching pattern:
is stored in a table of pre-computed optimized pulse patterns, and/or
has been optimized offline, such that the first switching instants generate the fundamental voltage component and such that the second switching instants leave the fundamental voltage component unchanged.

3. The method according to claim 1,
wherein the switching pattern is modified online by including the compensating switching instant and the neighboring switching instants into a precomputed optimized pulse pattern.

4. The method according to claim 3,
wherein switching times of the included neighboring switching instants are optimized online, such that the voltage of the second converter leaves the fundamental voltage component of the voltage of the first converter unchanged.

5. The method according to claim 1,
wherein the compensating switching instant results in a double step voltage change between a positive voltage and a negative voltage of the at least one floating cell, and
wherein a neighboring switching instant results in a single step voltage change between the positive voltage and a zero voltage or the negative voltage and the zero voltage.

6. The method according to claim 1,
wherein, for compensating the step size of the first switching instant of the first converter exceeding the step size limit, the second switching instants include a single step voltage change in a first direction before a switching time of the first switching instant and the compensating switching instant at the switching time of the first switching instant with a double step voltage change in an opposite direction.

7. The method according to claim 6,
wherein the second switching instants include the single step voltage change in the first direction after the switching time of the first switching instant exceeding the step size limit.

8. The method according to claim 6, wherein the second switching instants include:
two single step voltage changes in the first direction at different switching times before the switching time of the first switching instant exceeding the step size limit, and/or
two single step voltage changes in the first direction at different switching times after the switching time of the first switching instant exceeding the step size limit.

9. The method according to claim 1,
wherein the compensating switching instant and the neighboring switching instants are included into a precomputed optimized pulse pattern by an online post processing by a multi-stage modulation scheme.

10. The method according to claim 1,
wherein the compensating switching instant and the neighboring switching instants are included into a precomputed optimized pulse pattern by an online post processing by an optimized pulse pattern modulator.

11. The method according to claim 1,
wherein precomputed switching patterns are optimized based on at least one cost function and constraints.

12. The method according to claim 1,
wherein the switching pattern is composed of optimized pulse patterns for the first converter and the second converter, which are based on individual cost functions and constraints.

13. A computer program product comprising computer-executable program code portions having program code instructions configured to execute the method according to claim 1 when loaded into a computer-based control device.

14. A computer readable medium, in which the computer program product according to claim 13 is stored.

15. A power electronic converter device for an electrical power conversion system, the power electronic converter device comprising:
a converter circuit including an input side with input terminals, an output side with at least one AC output terminal, a first converter with semiconductor devices connected to the input terminals and at least one second converter connected between an AC output of the first converter and the AC output terminal, said second converter comprising at least one floating cell with a DC intermediate circuit and semiconductor devices and
a control device for driving the semiconductor devices of at least one of the first converter and the second converter, wherein the control device is configured for performing the method of claim 1.

* * * * *